Figure 1:
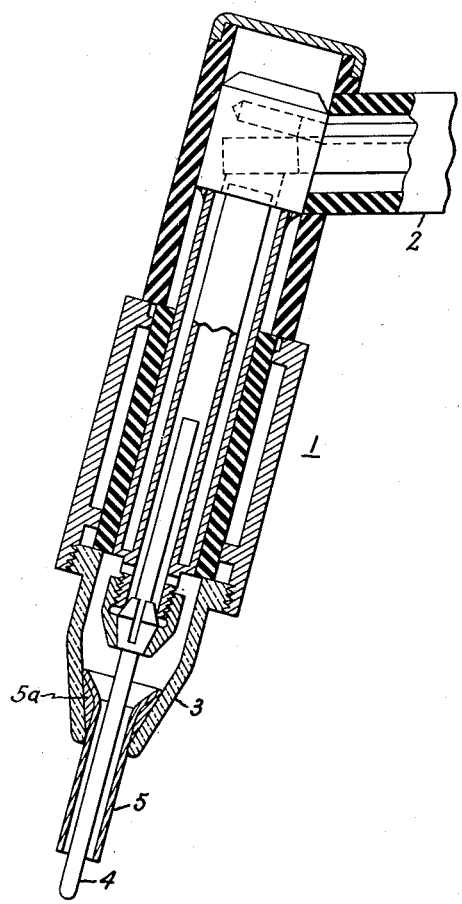

Sept. 30, 1952  J. P. MORRISSEY  2,612,584
INERT GAS WELDING TORCH
Filed Dec. 28, 1949

Inventor:
John P. Morrissey,
by William G. Edwards, Jr.
His Attorney.

Patented Sept. 30, 1952

2,612,584

UNITED STATES PATENT OFFICE 2,612,584

INERT GAS WELDING TORCH

John P. Morrissey, East Orange, N. J., assignor to General Electric Company, a corporation of New York Application December 28, 1949, Serial No. 135,341

3 Claims. (Cl. 219—14)

This invention relates to inert gas arc welding and, in particular, to an improved torch for inert gas arc welding.

In the inert arc welding process, an electric arc of extremely high current density is formed between a virtually non-consumable electrode, commonly tungsten, and the work. The electrode and the pool of fused metal formed in the work by the electric arc are surrounded by an atmosphere of inert monatomic gas, usually argon. The weld metal is thus protected from oxidation and other atmospheric contamination. As a result of this inert gas protection, the finished welded surface is smooth, clean and uniform without spatter.

In the use of this type torch, however, the arc produces such high temperatures that the torch must be cooled in some manner to protect the operator's hands. Cooling is frequently accomplished by providing a supply of fluid coolant to the head of the torch. For a more complete description of this type cooling, reference is made to a copending application Serial No. 100,984 Tuthill et al., assigned to the same assignee as the assignee of this invention.

A still further problem in the use of inert gas welding torches is that in order to strike the arc between an electrode and work, a high frequency high voltage current source is frequently employed until the arc is formed, whereupon the arc is continued by normal operating currents. With the use of this high frequency starting current, precaution must be taken to prevent the high voltage high frequency from grounding except at the welding electrode. For this purpose the torch is frequently provided with a ceramic tip commonly referred to as a nozzle tip or gas cup.

The difficulty of using ceramic tips for such torches is that the tip becomes red hot during the welding operation and then cannot withstand the thermal shock of cooling down to normal temperatures and, in addition, the ceramic tip is frequently so bulky that it is an impediment to the use of the torch in restricted locations.

It is an object of this invention to provide an improved tip for an inert gas welding torch.

It is a further object of this invention to provide an improved tip for welding torches provided with ceramic gas cups, the improved tip being an asset to the utility of the torch.

It is a still further object of this invention to provide an improved tip for a ceramic nozzle of an inert gas welding torch wherein the danger of the ceramic tip being destroyed in cooling from red heat is greatly reduced.

Broadly, this invention comprises the addition of a tube of heat resistant material to the gas cup of an inert gas welding torch. Where the body of the gas cup or nozzle is formed of a ceramic material, the added tube is made of metal which is heat-resistant and capable of radiating a large amount of heat imparted thereto by the arc before this heat can travel to and highly heat the ceramic nozzle. This added tubular part may project a substantial distance from the ceramic nozzle to position the arcing terminal of the electrode in the torch from the ceramic nozzle sufficiently to prevent the radiated heat from the arc from raising the ceramic nozzle to a temperature range destructive thereto. Furthermore, such an arrangement will reduce the terminal dimensions of the torch so that it can be manipulated in restricted places and yet secure the desired gas coverage at the point of welding.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

Figure 2:
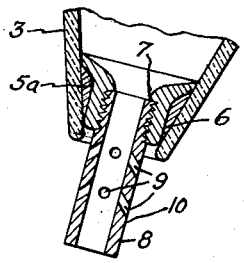

Referring to the drawing, Fig. 1 is a sectional view of an inert gas welding torch having my improved tip construction; and Fig. 2 is a sectional view of another embodiment thereof.

For a complete description of the welding head shown in Fig. 1, reference is made to application Serial No. 100,984 Tuthill et al., which describes the elements and operating principles of a liquid cooled inert gas torch.

For purposes of this description, reference is made primarily to the head 1 of welding torch 2. At the outer end of head 1, a ceramic gas cup or nozzle 3 is secured to head 1 and an electrode 4 of tungsten or the like is provided to extend centrally through the gas cup. A tube 5 of heat resistant metal, such as copper, stainless AISI type 309,310 or Inconel, having an internal diameter only slightly larger than that of the electrode 4, is secured to the inner periphery of the tip portion of the gas cup 3. This tube 5 may be joined to the gas cup by brazing with titanium hydride and a silver copper alloy seal 5a, or any other means of fastening may be employed. Tube 5 directs a flow of gas from gas cup 3 directly over electrode 4 and at the work (not shown) which is to be welded. In this manner the tube insures an envelope of gas over the work surface in more confined areas than would be possible if the cumbersome ceramic gas cup 3 were used alone. With tube 5 connected to ceramic cup 3, the tube 5 is insulated from the torch, and consequently there is little danger of grounding the torch to the work. Obviously, tubes of varying lengths can be used to serve the need that is required.

With the use of this tube 5, heat from the arc that normally causes cup 3 to become red hot is dissipated by the tube, thus preventing the shock cooling of the ceramic gas cup 3 that would take place if a tube were not employed.

In the alternative embodiment of this invention shown in Fig. 2, provision has been made for detachably securing tubes of various sizes to the same gas cup for accommodating different electrode sizes, securing different electrode projections from the torch and for renewing damaged or worn out tubes. Any suitable mechanical attachment may be used and the tube may be threaded at its end for engaging a thread in the tip of the gas cup. I prefer to employ an arrangement as illustrated where a ferrule 6 is secured to the inner periphery of gas cup 3 by any means, for instance, by the titanium hydride process indicated above. Ferrule 6 has an internal threaded bore 7 adapted to accommodate a threaded tube 8. With this structure, tubes can be readily interchanged in accordance with the size of the electrode and type required for providing accessibility for any specific job.

With arcing currents of 60 amperes or more, where there is greater heating at the arc, a plurality of louvers 9 may be drilled around the periphery of tube 8. Preferably, they slant from the inner core of tube 8 to the outer surface in the direction of gas flow to direct a supply of the inert gas over the outer wall 10 of tube 8 to cool and prevent oxidation of tube 8. These openings 9 may be arranged in one plane or in a plurality of planes with the holes in or out of axial alignment to give complete coverage to the outer wall 10 of tube 8. It has been found that the addition of these louvers 9 greatly prolong the life of tube 8 when welding with high current densities.

Modifications of this invention will occur to those skilled in the art and it is desired to be understood, therefore, that this invention is not to be limited to the particular embodiments disclosed, but that the appended claims are meant to cover all the modifications which are within the spirit and scope of this invention.

What I claim as new and desire to secure by Letters Patent of the United States is:

1. In an inert gas arc welding torch having a ceramic nozzle adapted to direct a gas flow about the arc and insulate the torch from the work to be welded and having an electrode extending through said ceramic nozzle from said torch, a heat resistant tube having an internal diameter larger than that of said electrode secured to said ceramic nozzle and extending concentric with said electrode, said tube having a plurality of holes in the wall thereof, each of said holes extending from the inner to the outer wall of said tube in the direction of the flow of the inert gas whereby a flow of inert gas is directed along the electrode towards the work to be welded and through said holes to cool said tube and prevent the oxidation thereof.

2. In an inert gas arc welding torch having a ceramic nozzle adapted to insulate the torch from the work to be welded and having an electrode extending through said ceramic nozzle from said torch, a ferrule secured to the inner periphery of said ceramic nozzle adjacent its outer end, said ferrule having a threaded internal bore concentric with said electrode, a heat resistant tube removably secured to said internal bore of said ferrule and extending concentric with said electrode to direct a flow of inert gas along said electrode toward the work to be welded.

3. In an inert gas arc welding torch of the water cooled type having a ceramic nozzle adapted to insulate the torch from the work to be welded and having an electrode extending through said ceramic nozzle from said torch, a ferrule secured to the inner periphery of said ceramic nozzle adjacent its outer end, said ferrule having a threaded internal bore concentric with said electrode, a heat resistant tube removably secured to said internal bore of said ferrule and extending concentric with said electrode to direct a flow of inert gas along said electrode toward work to be welded, said tube having a plurality of apertures therein extending from the inner to the outer wall thereof in the direction of the flow of said inert gas whereby a flow of inert gas may be directed toward work in restricted locations to be welded and a flow of gas is directed through said apertures to cool said tube and prevent oxidation thereof.

JOHN P. MORRISSEY.

REFERENCES CITED

The following references are of record in the file of this patent:

UNITED STATES PATENTS

| Number | Name | Date |
|---|---|---|
| 2,428,849 | Kratz et al. | Oct. 14, 1947 |
| 2,468,804 | Breymeier | May 3, 1949 |
| 2,468,807 | Herbst | May 3, 1949 |
| 2,468,808 | Drake | May 3, 1949 |
| 2,510,205 | Baird | June 6, 1950 |
| 2,514,060 | Hillman | July 4, 1950 |
| 2,547,872 | Kissick | Apr. 3, 1951 |